(12) United States Patent
Sun et al.

(10) Patent No.: US 12,478,586 B2
(45) Date of Patent: *Nov. 25, 2025

(54) SMALL MOLECULAR DRUG-LOADED POLYMER VESICLE, PREPARATION METHOD THEREFOR AND USE THEREOF (71) Applicant: SOOCHOW UNIVERSITY, Suzhou (CN)

(72) Inventors: Huanli Sun, Suzhou (CN); Zhiyuan Zhong, Suzhou (CN)

(73) Assignee: SOOCHOW UNIVERSITY, Suzhou (CN)

(*) Notice: Subject to any disclaimer, the term of this patent is extended or adjusted under 35 U.S.C. 154(b) by 326 days.

This patent is subject to a terminal disclaimer.

(21) Appl. No.: 18/012,410

(22) PCT Filed: Aug. 26, 2020

(86) PCT No.: PCT/CN2020/111532
§ 371 (c)(1),
(2) Date: Dec. 22, 2022

(87) PCT Pub. No.: WO2022/041017
PCT Pub. Date: Mar. 3, 2022

(65) Prior Publication Data
US 2024/0099977 A1 Mar. 28, 2024

(51) Int. Cl.
A61K 9/127 (2025.01)
A61K 9/1273 (2025.01)
(Continued)

(52) U.S. Cl.
CPC .......... A61K 9/1273 (2013.01); A61K 31/277 (2013.01); A61K 31/427 (2013.01);
(Continued)

(58) Field of Classification Search
CPC .............. A61K 9/1273; A61K 47/6913; A61K 47/6849; A61K 31/277; A61K 31/427;
(Continued)

(56) References Cited

U.S. PATENT DOCUMENTS

2020/0197534 A1 6/2020 Mei et al.
2020/0392289 A1* 12/2020 Yin ...................... A61K 33/243

FOREIGN PATENT DOCUMENTS

CN 107281141 * 10/2017 .............. A61K 9/19
CN 108126210 A 6/2018
(Continued)

OTHER PUBLICATIONS

Yang Chuan et al., "Structure-directing star-shaped block copolymers: Supramolecular vesicles for the delivery of anticancer drugs" Journal of Controlled Release, Mar. 23, 2015, vol. 208, pp. 93-105.
(Continued)

Primary Examiner — Jianfeng Song
(74) Attorney, Agent, or Firm — SZDC Law PC (57) ABSTRACT The present disclosed a preparation method preparation method for, and use of, a small molecular drug-loaded polymer vesicle. The small molecular drug-loaded polymer vesicle is prepared by assembling an amphiphilic block polymer and a small molecular drug; or is obtained by assembling and cross-linking the amphiphilic block polymer and a functionalized amphiphilic block polymer, loading the small molecular drug, and then reacting with a targeting monoclonal antibody. The vesicle system has many unique advantages, including small size, simple and controllable preparation, excellent biocompatibility, high stability of circulation in vivo, strong specific selectivity of tumor cells, high intracellular drug release rate, remarkable effect of tumor growth inhibition, etc. Therefore, the vesicle system is expected to become a simple and multi-functional nano-
(Continued)

platform for efficient and specific targeted delivery of vincristine sulfate to multiple myeloma cells.

2 Claims, 8 Drawing Sheets

(51) Int. Cl.
| | |
|---|---|
| *A61K 31/277* | (2006.01) |
| *A61K 31/427* | (2006.01) |
| *A61K 31/4745* | (2006.01) |
| *A61K 31/475* | (2006.01) |
| *A61K 31/704* | (2006.01) |
| *A61K 47/68* | (2017.01) |
| *A61K 47/69* | (2017.01) |

(52) U.S. Cl.
CPC ........ *A61K 31/4745* (2013.01); *A61K 31/475* (2013.01); *A61K 31/704* (2013.01); *A61K 47/6849* (2017.08); *A61K 47/6913* (2017.08)

(58) Field of Classification Search
CPC . A61K 31/4745; A61K 31/475; A61K 31/704
See application file for complete search history.

(56) References Cited

FOREIGN PATENT DOCUMENTS

| | | | | |
|---|---|---|---|---|
| CN | 108451907 A | * | 8/2018 | ............. A61K 47/34 |
| CN | 110229323 | * | 9/2019 | ............. A61K 47/34 |
| CN | 110229323 A | | 9/2019 | |
| CN | 111973556 A | | 11/2020 | |
| WO | 2013067537 A1 | | 5/2013 | |

OTHER PUBLICATIONS

Deng Chao et al, "Bioreducible Biodegradable Polymeric Nanocarriers: Construction and Applications" Polymer Bulletin, Oct. 31, 2015, Nr.: 10, pp. 42-50.

Ouyang Jia, "ApoE-targeted and Redox-sensitive Polymersomal Doxorubicin for the Treatment of Glioma" Chinese Doctoral Dissertations Full-text Database (Electronic Journal), Jan. 31, 2020, Nr.: 1, pp. 1-125.

* cited by examiner

SMALL MOLECULAR DRUG-LOADED POLYMER VESICLE, PREPARATION METHOD THEREFOR AND USE THEREOF

This application is the National Stage Application of PCT/CN2020/111532, filed on Aug. 26, 2020.

TECHNICAL FIELD

The present invention belongs to the field of polymer nanomedicine technology, and specifically relates to a reversibly cross-linked biodegradable polymer vesicle loaded with vincristine sulfate, and its preparation method and application in tumor-targeted therapy.

BACKGROUND

Vinblastine sulfate (VCR) is a potent, water-soluble drug that acts primarily on microtubule proteins to arrest mitosis in mid-cycle, but its severe neurotoxicity has resulted in low available doses. The liposomal vinblastine sulfate (Marqibo) nanomedicine, which was approved for marketing in 2012, prolongs the circulation time and reduces toxicity of VCR but the overall improvement is more limited. overall improvement is more limited. Therefore, it is crucial to achieve efficient and stable encapsulation of VCR and tumor-targeted delivery. The prior art discloses a vincristine sulfate liposome and a method for its preparation, the vincristine sulfate liposome comprising vincristine sulfate and a nanoliposome prepared using sphingomyelin, wherein vincristine sulfate is encapsulated in unanoliposome, the nanoliposome is prepared using sphingomyelin, and the liposome is made by encapsulating vincristine sulfate, wherein the sphingomyelin contains more amide bonds that can better resist the chemical reaction. The amide bond can better resist chemical and biological degradation, protect the stability of the liposome structure, and improve the drug enrichment of tumor cells, thereby improving the anti-tumor effect. The prior art also disclosed the preparation of bifunctional nanoparticle formulations encapsulating vincristine sulfate, wherein the bifunctional nanoparticle formulations were prepared by encapsulating vincristine sulfate in a folate/cell-penetrating peptide-modified PLGA-PEG polymer carrier by the compound emulsion method; the bifunctional nanoparticle formulations were prepared by showing good pharmacokinetic behaviors in vivo and ex vivo, and the folate/cell-penetrating peptide modified PLGA-PEG bifunctional nanoparticles prepared with a particle size of 287.2±0.8 nm had high drug loading and encapsulation rates, as well as good stability. Existing polymer vesicles with liposome-like structure have a hydrophilic inner cavity, which can be used to load hydrophilic small molecule drugs, however, the loading efficiency of hydrophilic drugs such as VCR is low, and lacks the multifunctionality of collective endocyclic stability, tumor-specific targeting, rapid release of intracellular drugs, and excellent biocompatibility in one package.

DISCLOSURE OF INVENTION

The purpose of the present invention is to disclose a preparation method for, and use of, an amphiphilic block polymer, drug-loaded polymer vesicle, specifically a preparation method for, and use of, a reversibly cross-linked biodegradable polymer vesicle loaded with vincristine sulfate (VCR).

Technical Solution

In order to achieve the above purpose, the present invention adopts the following technical solution: A drug-loaded polymer vesicle, wherein is prepared from a small molecule drug and an amphiphilic block polymer; or from a small molecule drug, amphiphilic block polymer, functionalized PEG-P (TMC-DTC), and a targeting monoclonal antibody;

The chemical structural of the amphiphilic block polymer is one of the following formula:

Wherein, z is 5-15.

In the present invention, in the amphiphilic block polymer, the molecular weight of the PEG is 3000 to 8000 Da; the molecular weight of PEG is 3000-8000 Da; the molecular weight of hydrophobic chain segment is 2.5-6 times that of PEG; and the molecular weight of PDTC chain segment is 8%-30% of that of hydrophobic chain segment. The amphiphilic block polymer of the present invention has hydrophilic chain segments (n chain segments), hydrophobic chain segments (x+y chain segments), $KD_z$ chain segments (z chain segments), and the hydrophobic chain segments, $KD_z$ chain segments are connected by urethane bonding; the amphiphilic block polymer can be denoted as PEG-P(TMC-DTC)-$KD_z$, PEG-P(LA-DTC)-$KD_z$, PEG-P(CL-DTC)-$KD_z$.

In the present invention, the small molecule drug could be a vincristine sulfate, an adriamycin hydrochloride, a epothilone hydrochloride, a verapamil hydrochloride, an irinotecan hydrochloride, or a resiquimod, preferably a vincristine sulfate (VCR); and the targeting monoclonal antibody is a CD38-targeting monoclonal antibody such as dalimumab (Dar), ezatuximab (Isa), or other CD38-targeting monoclonal antibody.

The preparation method for drug-loaded polymer vesicle is preparing the drug-loaded polymer vesicle by a solvent displacement method using a small molecule drug and an amphiphilic block polymer as raw materials; or preparing the drug-loaded polymer vesicle by a solvent displacement method using a small molecule drug, amphiphilic block polymer, functionalized amphiphilic block polymer, and a targeting monoclonal antibody as raw materials. Preferably, the drug-loaded polymer vesicles are prepared by assembling and cross-linking a functionalized amphiphilic block polymer and amphiphilic block polymer and loading the drug, then reacting with a CD38-targeting monoclonal antibody.

The present invention discloses the use of the drug-loaded polymer vesicle in preparing anti-myeloma drugs; the nanomedicine is an anti-tumor drug; the tumor is preferably multiple myeloma in situ.

The reversibly cross-linked degradable polymer vesicles of the present invention loaded with vincristine sulfate (VCR) are obtained by assembling and crosslinking an amphiphilic block polymer with an asymmetric membrane structure with a polyethylene glycol (PEG) outer shell, a reversibly cross-linked hydrophobic polycarbonate membrane layer, and an inner shell of $KD_z$, which allows for the efficient loading of VCR. The drug-loaded vesicles of the present invention are targeted or non-targeted structures, and the targeting molecules of the present invention are monoclonal antibody molecules or monoclonal antibody fragments, etc., monoclonal antibody molecules are such as dalimumab (Dar), ezatuximab (Isa) or other CD38-targeting monoclonal antibody.

The present invention firstly employs an amphiphilic block polymer with a functionalized amphiphilic block polymer, which is used as a raw material to prepare a drug-loaded vesicle, and then a CD38-targeting monoclonal antibody is attached to obtain a CD38-targeted drug-loaded vesicle. Functional groups are derived from PEG initiators, and the resulting polymer PEG ends with reactive functional groups, such as azide ($N_3$), maleimide (Mal), or N-hydroxysuccinimide (NHS), and as an example of the amphiphilic block polymer PEG-P(TMC-DTC), the functionalized amphiphilic block polymer can be $N_3$-PEG-P(TMC-DTC), Mal-PEG-P(TMC-DTC), or NHS-PEG-P(TMC-DTC).

The drug-loaded vesicles of the present invention consist of a drug and a vesicle, which is obtained by cross-linking a polymer, and targeting molecule can be modified or not; taking the amphiphilic block polymer PEG-P (TMC-DTC), and vinblastine sulfate as examples, the drug-loaded vesicles of the present invention may be prepared as follows:

(1) The terminal hydroxyl group of PEG-P (TMC-DTC) was activated by p-nitrophenyl chloroformate and then reacted with $KD_z$ to make PEG-P (TMC-DTC)-$KD_z$.
(2) The functionalized PEG-P(TMC-DTC) is prepared by introducing functional group such as $N_3$, Mal or NHS at the PEG end of PEG-P (TMC-DTC).
(3) The reversibly cross-linked degradable polymer vesicles loaded with VCR is preparing the drug-loaded polymer vesicle by a solvent displacement method using vincristine sulfate and PEG-P(TMC-DTC)-$KD_z$ as raw materials; or The reversibly cross-linked degradable polymer vesicles loaded with VCR is preparing the drug-loaded polymer vesicle by a solvent displacement method using vincristine sulfate, PEG-P(TMC-DTC)-$KD_z$ and functionalized PEG-P(TMC-DTC) as the raw materials. VCR-loaded, reversibly cross-linked, degradable polymer vesicles with reactive functional groups were prepared by solvent displacement, and then reacted with monoclonal antibodies to prepare monoclonal antibody-directed VCR-loaded multifunctional vesicles.

The present invention discloses the above-described reversibly cross-linked degradable polymer vesicles loaded with VCR and its method preparation, a solution of PEG-P (TMC-DTC)-$KD_z$ polymer is injected into the standing VCR aqueous solution, stirring and then dialyzing, the reversibly cross-linked degradable polymer vesicles (Ps-VCR) loaded with VCR are obtained. Specifically, mixing the VCR and ultrapure water with a HEPES buffer (pH 6.8, 10 mM), and then injecting the DMSO solution of PEG-P (TMC-DTC)-$KD_z$ polymer into it under static state, after stirring for 3-5 min dialyzing with HEPES (pH 7.4, 10 mM), to obtain Ps-VCR.

The present invention also discloses a monoclonal antibody-directed, VCR-loaded, reversibly cross-linked degradable polymer vesicle and its method preparation: mixing the DMSO solution of PEG-P(TMC-DTC)-$KD_z$ and functionalized polymer (such as the DMSO solution of $N_3$-PEG-P (TMC-DTC)), and then injecting into a HEPES solution containing VCR, stirring for 3-5 min. After that dialyzing to obtain reversibly cross-linked polymer vesicles containing $N_3$ loaded VCR on the surface; by dibenzocyclooctyne-modified monoclonal antibodies, such as dalimumab (Dar), ezatuximab (Isa), or other CD38-targeting monoclonal antibody, and azido-functionalized VCR-loaded vesicles ($N_3$-Ps-VCR) can be prepared by a tensile-tactile click chemistry under mild conditions to obtain the monoclonal antibody-directed loaded VCR vesicles (Ab-Ps-VCR). In the same way, Ab-Ps-VCR can also be simply prepared by Michael addition reaction of sulfhydryl-functionalized monoclonal antibody molecules with Mal-containing loaded VCR vesicles on the surface or amidation reaction of monoclonal antibody with NHS-functionalized loaded VCR vesicles.

In the polymer of the present invention, KD is well biocompatible and combines PEG chain segments with hydrophobic chain segments, which can form asymmetric membrane structure vesicles to realize efficient and stable encapsulation of small molecule drugs (e.g., VCRs); the present invention encapsulates VCR by electrostatic force, while separation from the outside world with the vesicle membrane, It can avoid losses and toxic side effects caused by leakage and cell adhesion during transportation, efficiently deliver to the lesion site, and rapidly release VCR under the action of the reducing agent glutathione (GSH) in the body, effectively killing tumor cells.

The polymer vesicles of the present invention are reduction-sensitive reversibly cross-linked, intracellularly de-cross-linked and biodegradable polymer vesicles with negatively charged inner membranes; polymers are PEG-P(TMC-DTC)-$KD_z$, in which the intermediate embedded segments of TMC (LA or CL) and DTC are arranged in a randomized manner; the molecular weight of $KD_z$ is 700-2000 Da, which is much lower than the molecular weight of the PEG segment. After self-assembly and cross-linking, reversibly cross-linked polymer vesicles with negatively charged inner membranes are obtained, and the inner shells of the vesicles are $KD_z$, which are used for compounding small molecule drugs. The vesicle membrane is a biodegradable and compatible PTMC with reversible cross-linking, and the structure of dithiopentane in the side chain is similar to the natural antioxidant alpha lipoic acid in human body, which can spontaneously form a reduction-sensitive reversible cross-linking, which not only ensures stable and long circulation of the drug in blood, but also realizes the rapid intracellular decross-linking and fast release of the drug into the target cells.

The present invention discloses the application of the above-described VCR-loaded, tumor-targeted, reversibly cross-linked degradable polymer vesicles in the preparation of anti-tumor-targeted nanomedicines. Preferably, the tumor is multiple myeloma.

Beneficial Effects

The present invention has the following advantages compared to the prior art:
1. The present invention designs new small molecule hydrophilic drug VCR-carrying vesicles and tumor-targeted delivery; the vesicle membrane is a biodegradable and biocompatible PTMC with reversible cross-linking, and the dithiopyrrolidine in the side chain provides reduction-sensitive reversible cross-linking, which not only ensures long circulation of the drug in the bloodstream, but also allows for rapid intracellular decross-linking and release of the drug into the target cell; the shell is a PEG It also has targeting molecules such as monoclonal antibody, which can specifically bind to cancer cells; the small size of the vesicles and tumor-specific targeting make the vesicles efficiently deliver VCR to the tumor cells.
2. The drug-loaded vesicles disclosed herein have significant anti-tumor effects ex vivo and in vivo, and the polymer is biocompatible, allowing the formation of vesicles with an asymmetric membrane structure, which provides a good drug-loaded effect.
3. The degradable polymer vesicle carrier of the present invention avoids the defects of existing nanocarriers such as large particle size, poor in vivo cycling stability, low tumor cell selectivity, and slow intracellular VCR release.
4. The vesicle system of the present invention possesses many unique advantages, including small size, simple and controllable preparation, excellent biocompatibility, high in vivo cycling stability, high tumor cell specific selectivity, fast intracellular drug release, and significant tumor growth inhibition. Therefore, this vesicle system is expected to be a simple and multi-functional nanoplatform for efficient and specific targeted delivery of VCR to multiple myeloma cells.

EXAMPLES OF THE INVENTION

The VCR-loaded reversibly cross-linked degradable polymer vesicles of the present invention are obtained by self-assembly of an amphiphilic triblock polymer undergoing simultaneous self-crosslinking; the molecular chain of triblock polymer comprises sequentially connected hydrophilic chain segments, hydrophobic chain segments, and a KD molecule; hydrophilic chain segment is a polyethylene glycol (PEG) with a molecular weight of 3000-8000 Da; hydrophobic chain segment is a polycarbonate chain segment with a molecular weight of 2.1-5.7 times the molecular weight of the hydrophilic chain segment; and the molecular weight of the KD polypeptide is 15%-50% of the molecular weight of the PEG hydrophilic chain segment.

The PEG-P(TMC-DTC)-$KD_z$ polymer of the present invention was produced by the reaction of $KD_z$ after activation of the terminal hydroxyl group of PEG-P(TMC-DTC) by p-nitrophenyl chloroformate (p-NPC) by the following synthetic route.

polymer PEG-P(TMC-DTC)-$KD_z$. TMC was routinely replaced with LA or CL to obtain PEG-P(LA-DTC)-$KD_z$, PEG-P(CL-DTC)-$KD_z$.

The raw materials involved in the present invention are existing commercially available raw materials, and the specific preparation methods and testing methods are conventional techniques in the art; the present invention will be further described below with reference to the examples and accompanying drawings.

Wherein, in step (i), the reaction conditions are anhydrous dichloromethane (DCM), pyridine, 25° C., 24 hrs; in step (ii), the reaction conditions are anhydrous dimethylsulfoxide (DMSO), $KD_z$, triethylamine, 30° C., 48 hrs.

The specific synthesis steps are as follows.

(1) Pyridine was added to an anhydrous DCM solution of PEG-P(TMC-DTC) in an ice water bath, stirred for 10 minutes and then a DCM solution of p-NPC was added to it slowly dropwise. After the dropwise addition was completed (~30 min) the reaction was continued at room temperature for 24 h. Then the pyridine salt was removed by filtration and the polymer solution was collected and concentrated by spinning to ~100 mg/mL, which was precipitated by ice ether and dried in vacuo to give the product PEG-P(TMC-DTC)-NPC.

(2) Under nitrogen protection, the $KD_z$ peptide was weighed and placed in a two-necked round-bottomed flask and anhydrous DMSO was added to completely dissolve the peptide, triethylamine was added under stirring, and then anhydrous DMSO solution of PEG-P(TMC-DTC)-NPC was added to it drop by drop, and the dropwise addition was completed in 30 minutes. After 2 days of reaction at 30° C., the polymer solution was first dialyzed with DMSO containing 5% anhydrous methanol for 36 h (with 4-5 media changes) to remove unreacted $KD_z$ and reacted p-nitrophenol, and then dialyzed with DCM for 6 h. Then the polymer solution was collected and concentrated by spinning to a polymer concentration of about 50 mg/mL, and then precipitated in iced ethyl ether and then dried in vacuum, which resulted in the white cotton-wool-like Example 1 Synthesis of Polymer $N_3$-PEG-P (TMC-DTC)

Figure 1:
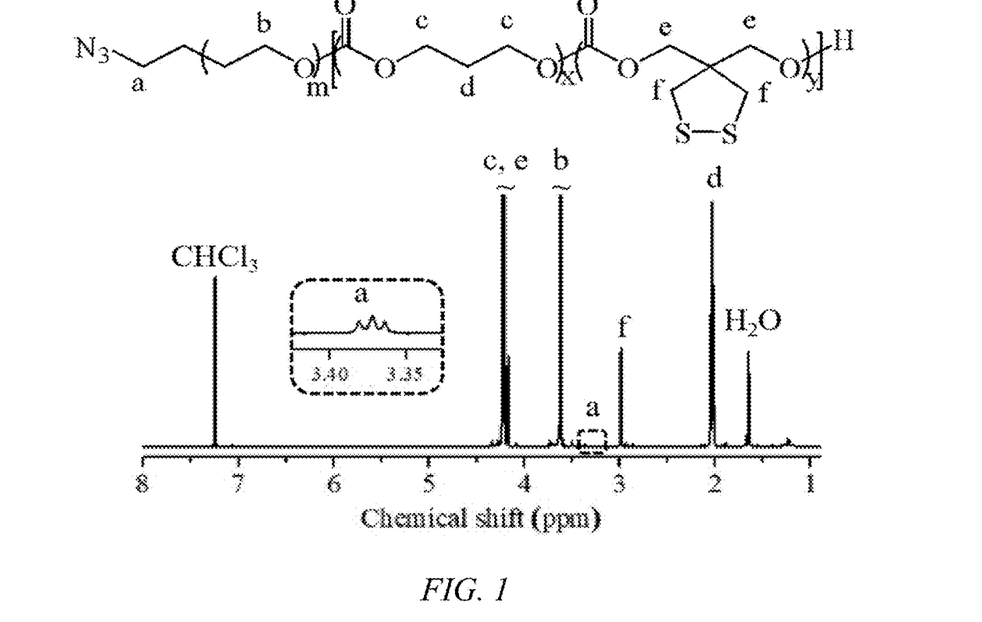
FIG. 1 is nuclear magnetic map of $N_3$-PEG-P (TMC-DTC) in Example 1.

The polymer $N_3$-PEG-P (TMC-DTC) was obtained by initiating the ring-opening co-polymerization of TMC and DTC using DPP as a catalyst and $N_3$-PEG-OH as a macro-initiator. First, $N_3$-PEG-OH ($M_n$=7.9 kg/mol, 0.79 g, 0.1 mmol), TMC (1.50 g, 14.8 mmol) and DTC (0.20 g, 1.0 mmol) were weighed in a closed reactor under nitrogen environment in a glove box, and 5.0 mL of anhydrous DCM was added to dissolve them, followed by the addition of DPP (0.25 g, 1.2 mmol), and the reactor was sealed and transferred out of the glove box and placed at 30° C. for four days. At the end of the reaction, it was precipitated twice with ice ether and dried under vacuum to obtain the white flocculent polymer $N_3$-PEG-P (TMC-DTC), yield: 85.4%. The characteristic peaks of $N_3$-PEG at δ 3.38 and 3.63 ppm, TMC at δ 2.03 and 4.18 ppm, and DTC at δ 2.99 and 4.22 ppm can be seen in the attached FIG. 1. The molecular weight of the $N_3$-PEG-P(TMC-DTC) polymer can be calculated from the ratio of the methylene hydrogen integral area at δ 2.03 and δ 2.99 ppm to the PEG methylene hydrogen integral area at δ 3.63 ppm to obtain a molecular weight of 7.9-(15.0-2.0) kg/mol, with a molecular weight distribution of 1.1 as measured by the GPC, and is used in the following examples.

Replacing $N_3$-PEG-OH with $CH_3$O-PEG-OH having a molecular weight of 5 k, and leaving the rest unchanged, and referring to the above preparation method, PEG-P(TMC-DTC) (5.0-(15.0-2.0) kg/mol) was obtained.

Example 2 Synthesis of Polymer PEG-P(TMC-DTC)-KD$_z$

Figure 2:
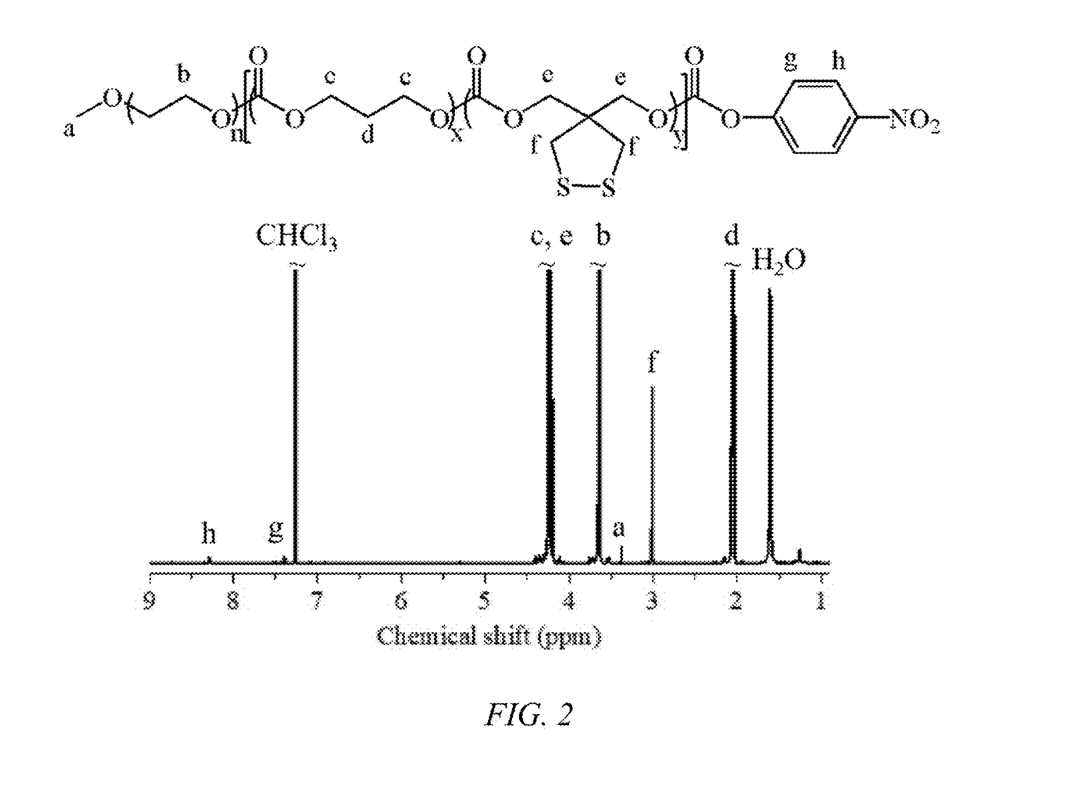
FIG. 2 is nuclear magnetic map of PEG-P(TMC-DTC)-NPC in Example 2.
Figure 3:
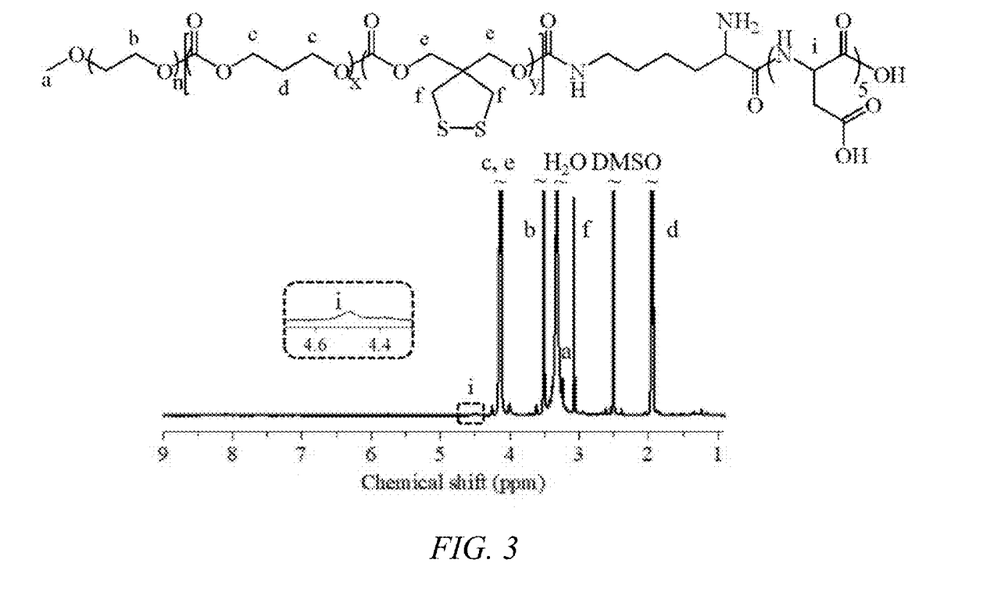
FIG. 3 is nuclear magnetic map of PEG-P(TMC-DTC)-$KD_5$ in Example 2.

The polymer PEG-P(TMC-DTC)-KD$_z$ was synthesized in two steps, i.e., it was obtained by reacting with the KD$_z$ peptide molecule after activating the terminal hydroxyl group of PEG-P(TMC-DTC) (5.0-(15.0-2.0) kg/mol) using p-NPC. As an example, the synthesis of PEG-P(TMC-DTC)-KD$_5$ was carried out as follows: PEG-P(TMC-DTC) (1.0 g, 45.5 μmol) was dissolved in 10 mL of anhydrous DCM under nitrogen atmosphere, and then transferred to an ice-water bath with the addition of pyridine (18.0 mg, 227.5 μmol) and stirred for 10 min, to which was added dropwise p-NPC (48.4 mg, 240.3 μmol) to which was added dropwise DCM solution (1.0 mL). 30 min after completion of the dropwise addition, the reaction was continued at room temperature for 24 h. Then the pyridine salt was removed by filtration and the polymer solution was collected and concentrated by spinning to ~100 mg/mL, which was precipitated by iced ethyl ether and dried under vacuum to obtain the product PEG-P(TMC-DTC)-NPC in a yield of: 90.0%. Subsequently, KD$_5$ (60.0 mg, 83.4 μmol) was weighed and dissolved in 4 mL of anhydrous DMSO under nitrogen protection and triethylamine (4.2 mg, 41.7 μmol) was added to it dropwise under stirring, and then anhydrous DMSO solution (9.0 mL) of PEG-P(TMC-DTC)-NPC was added to it dropwise, and the dropwise addition was completed in 30 min. After 2 days of reaction at 30° C., the polymer solution was dialyzed with DMSO containing 5% anhydrous methanol for 36 h (4-5 media changes) to remove unreacted KD$_5$ and reacted p-nitrophenol, and then dialyzed with DCM for 6 h. Then the polymer solution was collected and concentrated by spinning to a polymer concentration of 50 mg/mL, and the polymer was precipitated in iced ether and dried in vacuum to give a white cotton-wool-like polymer PEG-P(TMC-DTC)-KD$_5$, yield: 91.0%. The NMR hydrogen spectra of PEG-P(TMC-DTC)-NPC and PEG-P(TMC-DTC)-KD$_5$ are shown in the attached FIGS. 2 and 3. The characteristic peaks of p-NPC (δ 7.41 and δ 8.30 ppm) as well as the characteristic peaks of PEG-P(TMC-DTC) (δ 2.03, 2.99, 3.38, 3.63, 4.18, and 4.22 ppm) can be seen in the accompanying FIG. 2, which were calculated based on the ratio of the integrated area of the characteristic peaks of p-NPC to the area of the peak of the methyl hydrogen of the PEG at δ 3.38 ppm the grafting rate of NPC was about 100%. Attachment 3 shows that the characteristic peaks of NPC at δ 7.41 and δ 8.30 ppm disappeared, and a new signal peak appeared at δ 4.54 ppm, which is the characteristic peak of hypomethyl group in KD$_5$. The degree of substitution of KD$_5$ was calculated to be ~100% by comparing the ratio of the peak area at δ 4.54 ppm to that of the TMC hypomethylidene hydrogen peak area at δ 1.95 ppm. In addition, the grafting ratio of KD$_5$ was 100% as measured by high performance liquid chromatography (HPLC), demonstrating the successful synthesis of PEG-P(TMC-DTC)-KD$_5$ for the following Examples.

Example 3 Preparation of Reversibly Cross-Linked Biodegradable Vesicles Loaded with VCR (Ps-VCR)

Ps-VCR was prepared by solvent displacement wherein the VCR was encapsulated by electrostatic interactions with KD$_z$. Ps-VCR was obtained by dissolving PEG-P(TMC-DTC)-KD$_z$ in DMSO (40 mg/mL), taking 100 μL and beating it into 900 μL of HEPES (pH 6.8, 10 mM) containing the VCR at rest, stirring at 300 rpm for 3 min, and then dialyzing it with HEPES (pH 7.4, 10 mM) for 8 hr. where the VCR The theoretical drug loading was set at 4.8-11.1 wt. %, and it was found that the particle size of the resulting Ps-VCR ranged from 26-40 nm with a particle size distribution of 0.05-0.20 (Table 1). The encapsulation rate of Ps-VCR was calculated to be 97.2% by measuring its absorbance value at 298 nm by UV-visible spectroscopy. Based on the same method, the encapsulation rates of Ps-VCR prepared by PEG-P(LA-DTC)-KD$_5$ and PEG-P(CL-DTC)-KD$_5$ at a theoretical loading capacity of 4.8% were 88.3% and 83.9%, respectively; whereas, the particle size of the drug-loaded vesicles prepared by PEG-P(TMC-DTC) two-block copolymers was around 75 nm, and the encapsulation rate of the VCRs was lower which was only 14.1%.

TABLE 1

Index of Ps-VCR

| polymer | particle size (nm)$^a$ | PDI$^a$ | DLC (wt. %)$^b$ theory | test | DLE$^b$ (%) |
|---|---|---|---|---|---|
| PEG-P(TMC-DTC) | 75 | 0.12 | 4.8 | 0.7 | 14.1 |
| PEG-P(TMC-DIC)-KD$_5$ | 36 | 0.11 | 4.8 | 4.6 | 97.2 |
|  | 38 | 0.12 | 7.0 | 4.3 | 60.2 |
| PEG-P(TMC-DTC)-KD$_{10}$ | 31 | 0.06 | 4.8 | 4.2 | 88.0 |
|  | 33 | 0.12 | 7.0 | 4.1 | 57.3 |
| PEG-P(TMC-DTC)-KD$_{15}$ | 26 | 0.08 | 4.8 | 4.1 | 86.2 |
|  | 28 | 0.08 | 7.0 | 4.8 | 66.7 |

$^a$tested by DLS
$^b$tested by UV-vis

Example 4 Preparation of Reversibly Cross-Linked Biodegradable Vesicles Loaded with Other Drugs (Ps-Drug)

The encapsulation of other drugs such as verapamil hydrochloride (VER), irinotecan hydrochloride (CPT), and recoquimod (R848) by reversibly cross-linked degradable vesicles was investigated using a similar methodology as in Example 3. It was found that after encapsulation of different drugs, the particle size of the resulting Ps-drugs ranged from 20-40 nm, as shown in Table 2.

TABLE 2

Index of Ps-drug

| polymer | Drug | particle size (nm)[a] | PDI[a] | DLC (wt. %)[a] theory | DLC (wt. %)[a] test | DLE[b] (%) |
|---|---|---|---|---|---|---|
| PEG-P(TMC-DTC)-KD$_{10}$ | VER | 27 | 0.17 | 4.7 | 0.3 | 5.0 |
|  |  | 30 | 0.13 | 9.0 | 0.4 | 4.0 |
|  |  | 33 | 0.18 | 13.0 | 0.7 | 4.5 |
| PEG-P(TMC-DTC)-KD$_5$ | CPT | 30 | 0.17 | 5.0 | 0.48 | 9.5 |
| PEG-P(TMC-DTC)-KD$_{10}$ |  | 29 | 0.15 | 5.0 | 0.15 | 0.3 |
| PEG-P(TMC-DTC)-KD$_{10}$ |  | 31 | 0.16 | 10.0 | 0.06 | 0.6 |
| PEG-P(TMC-DTC)-KD$_{10}$ |  | 32 | 0.26 | 20.0 | 0.80 | 4.0 |
| PEG-P(TMC-DTC)-KD$_{15}$ |  | 39 | 0.23 | 20.0 | 0.82 | 4.1 |
| PEG-P(TMC-DTC)-KD$_{10}$ | R848 | 23 | 0.11 | 12.0 | 0.7 | 6.1 |
|  |  | 24 | 0.12 | 40.0 | 1.6 | 4.0 |

[a]tested by DLS
[b]tested by UV-vis

Example 5 Preparation of Monoclonal Antibody-Directed Polymeric Vesicles Loaded with VCR (Ab-Ps-VCR)

Ab-Ps-VCR was obtained by post-modifying a dibenzocyclooctyne-functionalized monoclonal antibody (Ab-DBCO) on the surface of an azide-functionalized polymeric vesicular VCR nanomedicine ($N_3$-Ps-VCR). $N_3$-Ps-VCR was obtained by coassembling $N_3$-PEG-P (TMC-DTC) and PEG-P (TMC-DTC)-KD$_z$ while encapsulating a VCR obtained, wherein the content of $N_3$-PEG-P(TMC-DTC) is 1 to 10 wt. %. Specifically, as an example of the preparation of $N_3$-Ps-VCR containing 2% $N_3$-PEG-P(TMC-DTC), 8.0 mg of $N_3$-PEG-P(TMC-DTC) and 392.0 mg of PEG-P (TMC-DTC)-KD$_5$ (molar ratio of 2:98) were weighed and dissolved in DMSO (the total polymer concentration of 40 mg/mL), and at the same time, 4.0 mL of An aqueous solution of VCR (5 mg/mL) was added to 90 mL of HEPES (pH 6.8, 10 mM) and mixed well, into which 10 mL of the polymer solution was injected under standstill, stirred for 5 min, and then placed at 37° C. for 4 hours. After removing the organic solvent by dialysis (MWCO: 14 kDa) with HEPES (pH 7.4, 10 mM) for 8 h, a nanofiltration system was used to remove the free VCR, yielding $N_3$-Ps-VCR. The particle size of $N_3$-Ps-VCR was measured by dynamic light scattering (DLS) to be 36 nm with a narrow distribution (PDJ: 0.11). The encapsulation rate was as high as 97.2% when the theoretical drug loading of VCR was 4.8 wt. % with 4.6 wt. %. In order to efficiently bond the monoclonal antibody, the $N_3$-Ps-VCR was subsequently concentrated from 4 mg/mL to 18.6 mg/mL using a tangential flow device to facilitate storage and improve the bonding efficiency of the monoclonal antibody. The particle size of $N_3$-Ps-VCR after concentration was 42 nm and the PDI was 0.07. Its particle size remained around 40 nm, the PDI was less than 0.17, and the leakage of VCR was less than 0.6% during 180 days of storage at 4° C., indicating that the $N_3$-Ps-VCR has excellent long-term storage stability (Table 3).

TABLE 3 long-term storage stability at 4° C. of N3-Ps-VCR

| Time (Day) | Particle size (nm)[a] | PDI[a] | Leakage of VCR(%)[b] |
|---|---|---|---|
| 0 | 42 | 0.07 | — |
| 15 | 42 | 0.08 | 0.39 |
| 45 | 36 | 0.15 | 0.39 |
| 90 | 38 | 0.17 | 0.58 |
| 132 | 37 | 0.14 | 0.28 |
| 180 | 37 | 0.15 | 0.17 |

[a]tested by DLS
[b]tested by UV-vis

Figure 4:
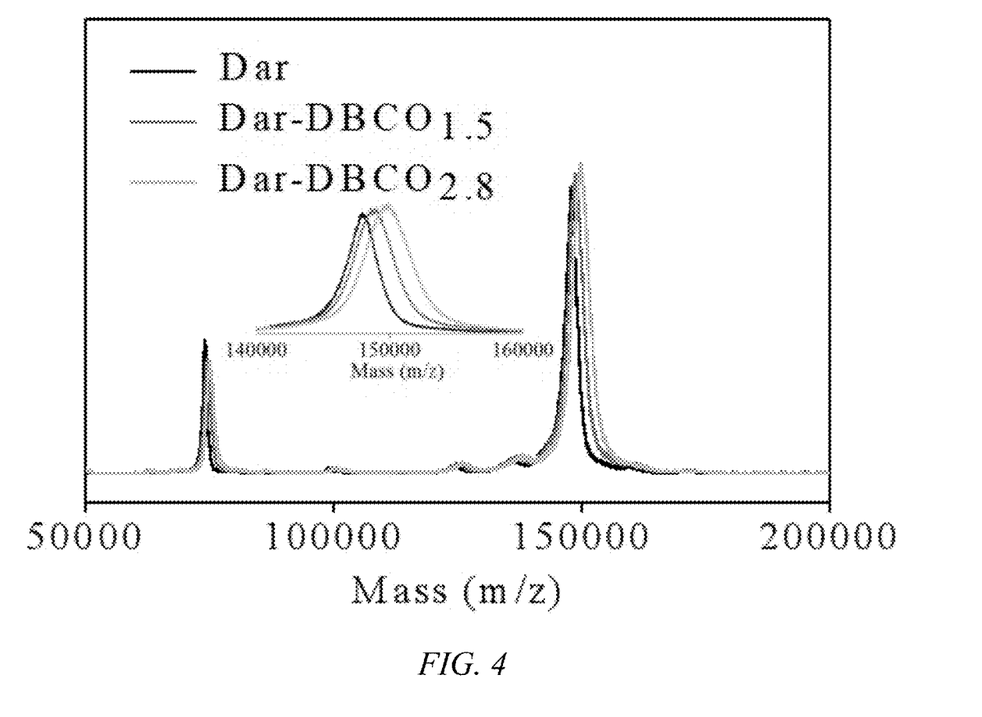
FIG. 4 shows the macromolecular mass spectra of Dar and Dar-DBCO in Example 5.

Ab-DBCO was prepared by amidation of the small molecule NHS-OEG$_4$-DBCO with the amino group on the monoclonal antibody, wherein the degree of DBCO functionalization can be adjusted by changing the molar ratio of Ab to NHIS-OEG$_4$-DBCO. Taking the preparation of DBCO-functionalized daratumumab (Dar-DBCO) as an example, a PBS solution (21.7 mg/mL) of Dar was diluted to 10 mg/mL with PB (pH 8.5, 10 mM), and 200 µL of it was taken and to it was added 3 or 5-fold molar equivalents of a DMSO solution (5 mg/mL) of NHS-OEG$_4$-DBCO under shaking, and placed at 27° C., 120 rpm shaker for overnight reaction. At the end of the reaction, unreacted NHS-OEG$_4$-DBCO was removed by centrifugation (MWCO: 10 kDa, 3000 rpm) in an ultrafiltration tube and the ultrafiltration was washed twice with PBS (pH 7.4, 10 mM) to obtain Dar-DBCO. when the molar ratios of Dar to NHS-OEG$_4$-DBCO were 1:3 and 1:5, the reaction was analyzed by time-of-flight mass spectrometry (MALDI-TOF-MS), 1.5 and 2.8 DBCO were modified on each Dar, respectively (Supplementary FIG. 4), denoted as Dar-DBCO$_{1.5}$ and Dar-DBCO$_{2.8}$. In order to maximize the targeting and biological activity of the monoclonal antibodies, subsequent experiments were conducted with Dar-DBCO$_{1.5}$ or other monoclonal antibodies modified with 1.5-2 DBCO.

Dar-Ps-VCR can be simply prepared by a click chemistry reaction of tensile touching between $N_3$ and Dar-DBCO on the surface of $N_3$-Ps-VCR, and the surface density of Dar can be adjusted by changing the feeding ratio. The molar ratios of Dar-DBCO to $N_3$ were set to be 0.25:1, 0.5:1, and 1:1, respectively, i.e., 10.4, 20.9, and 41.8 µL of Dar-DBCO solution (5.6 mg/mL) were added to 107.5 µL of $N_3$-Ps-VCR (18.6 mg/mL), respectively, and then the reaction was carried out in a shaker at 25° C., 100 rpm overnight. Unbonded Dar-DBCO was removed using ultracentrifugation (58 krpm, 4° C., 30 min) and washed twice with HEPES (pH 7.4, 10 mM), while Dar-Ps-VCR and supernatant were collected to determine the amount of Dar bonded. The unbonded Dar-DBCO in the supernatant was determined by HPLC, which led to the calculation of 28.6, 56.4, and 112.2 g of Dar per mg of polymer vesicle surface, respectively, and the calculation of the absolute molecular weight of the polymer vesicles ($1.15 \times 10^7$ g/mol) and the number of aggregates (523), measured by multiangle laser light scattering, showed that each Dar-Ps-VCR surface was bonded with 2.2, 4.4 and 8.7 Dar, respectively (Table 4). With the increase of Dar density, the particle size of Dar-Ps-VCR increased slightly (43-49 nm) and the particle size distribution was narrower (PDI: 0.14-0.21), and the encapsulation results were the same as the present Example of $N_3$-Ps-VCR after the monoclonal antibody was received.

TABLE 4

Indexes of different density of Dar-Ps-VCR

| Targeting drug vesicle | molar ratio of Feeding Dar-DBCO:$N_3$ | efficiency (%) | Bonding Dar μg/mg $Ps^a$ | number Per Ps | particle size (nm)$^b$ | PDI$^b$ |
|---|---|---|---|---|---|---|
| $Dar_{2.2}$-Ps-VCR | 0.25:1 | 96.6 | 28.6 | 2.2 | 43 | 0.14 |
| $Dar_{4.4}$-Ps-VCR | 0.5:1 | 95.3 | 56.4 | 4.4 | 45 | 0.15 |
| $Dar_{8.7}$-Ps-VCR | 1:1 | 94.8 | 112.2 | 8.7 | 49 | 0.21 |

$^a$tested by HPLC;
$^b$tested by DLS

Other monoclonal antibody-directed loaded VCR polymer vesicles such as Isa-Ps-VCR and Anti-CD38-Ps-VCR are prepared similarly to Dar-Ps-VCR. Their particle sizes ranged from 40-60 nm with a narrow particle size distribution (PDI: 0.10-0.30) and the number of monoclonal antibodies on the surface of each vesicle was 1-10.

The prior art CN110229323A Table 7 discloses that saponin-carrying protein (SAP) non-targeting vesicles ($KD_5$) undergo ultracentrifugation (58 krpm, 4° C., 30 min) show a decrease in DLE from 68.3% to 23%, with a large amount of drug leakage, suggesting that they are unable to pick up a targeted monoclonal antibody.

Figure 5:
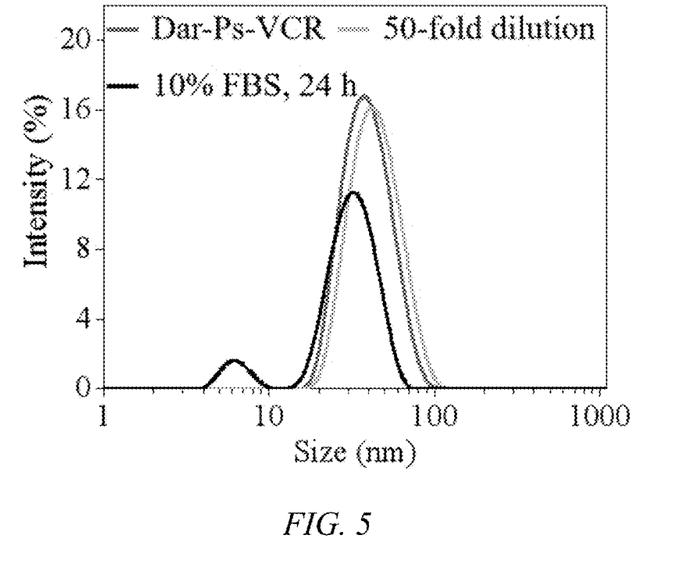
FIG. 5 shows a graph of the stability of Dar-Ps-VCR in Example 6 at high dilutions and in the presence of serum.

Example 6 Stabilization and In Vitro Drug Release of Ab-Ps-VCR Targeted Polymeric Vesicle Nanomedicines $Dar_{4.4}$-Ps-VCR containing 4.4 Dar on the surface of each vesicle was used as a representative to study the stability and in vitro drug release behavior of Ab-Ps-VCR targeted vesicle nanomedicine. The stability of Dar-Ps-VCR was determined by 50-fold dilution of phosphate buffer solution or addition of 10% fetal bovine serum, respectively, and the particle size changes were detected by dynamic light scattering. The particle size distribution of Dar-Ps-VCR stability is shown in the accompanying FIG. 5. The results showed that Dar-Ps-VCR targeted vesicle nanomedicine maintained intact particle size and particle size distribution with good stability after 50-fold dilution and addition of 10% FBS for 24 hours.

Figure 6:
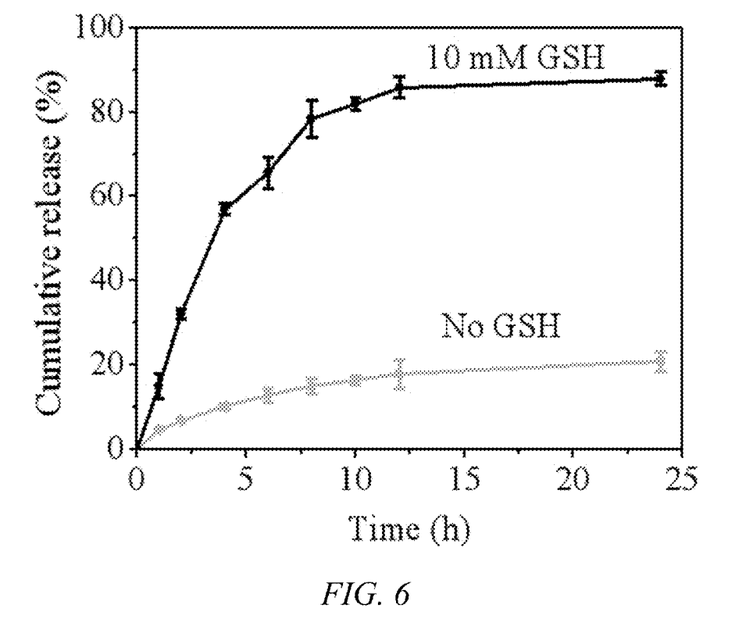
FIG. 6 shows the VCR release behavior of Dar-Ps-VCR in Example 6 under non-reducing conditions and 10 mM GSH.

The in vitro drug release behavior of Dar-Ps-VCR was studied using a dialysis method with 2 release media, HEPES (pH 7.4, 10 mM) and HEPES solution containing 10 mM GSH (nitrogen environment). Firstly, 0.5 mL of Dar-Ps-VCR (0.5 mg/mL) was loaded into a release bag (MWCO: 14 kDa) and then placed in 20 mL of the corresponding release medium at 37° C., 100 rpm in a shaker. At set time points (0, 1, 2, 4, 6, 8, 10, 12, 24 h) 5 mL of dialysate was removed and 5 mL of fresh medium was replenished. The amount of VCR in the dialysate was determined by HPLC (mobile phase methanol:water (15% triethylamine added and pH adjusted to 7.0 with phosphoric acid)=70:30). The results of in vitro release of Dar-Ps-VCR-targeted vesicular nanomedicine are plotted in the accompanying FIG. 6. The results showed that Dar-Ps-VCR released more than 85% of VCR in 12 h under the reducing condition of 10 mM GSH, while the cumulative release of VCR was only about 22% in 24 h under the non-reducing condition.

Figure 7:
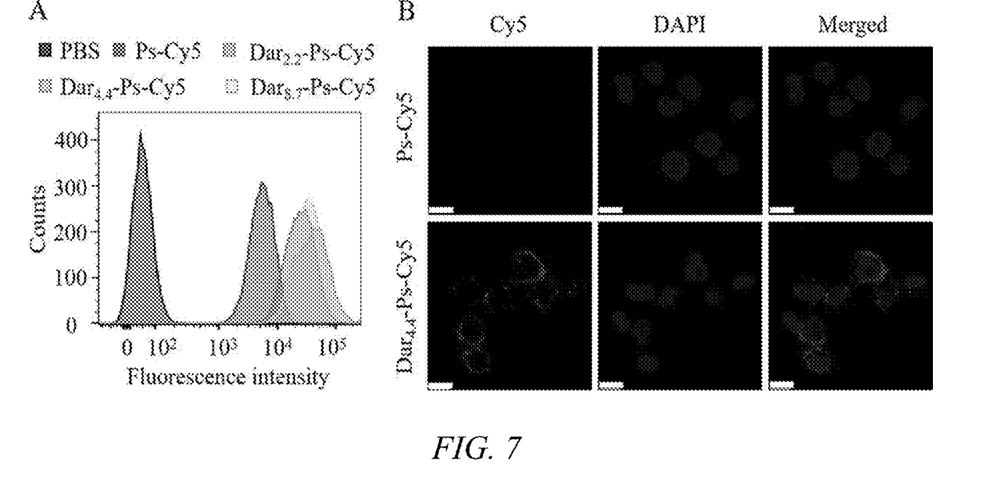
FIG. 7 shows the endocytosis of (A) Dar-Ps-Cy5 at different targeting densities in LP-1 cells in Example 7 and (B) CLSM images of LP-1 cells after incubation with $Dar_{4.4}$-Ps-Cy5 and Ps-Cy5 for 4 hr (scale bar: 25 μm).

Example 7 Endocytosis Behavior of Dar-Ps-VCR Targeted Polymeric Vesicle Nanomedicines Since the VCR itself is non-fluorescent, Cy5-labeled polymer vesicles were used, and Dar-Ps-Cy5 was prepared with reference to Example 5, and Ps-Cy5 was prepared with reference to Example 3; the uptake of Dar-Ps-Cy5 with different Dar densities in LP-1 cells was studied by flow cytometry and laser scanning confocal microscopy (CLSM). In flow experiments, LP-1 cell suspensions were first spread in 6-well plates ($2 \times 10^5$ cells/well) and placed in the incubator for 24 h. After incubation, 200 μL of Dar-Ps-Cy5 and Ps-Cy5 were added to each well (the concentration of Cy5 in the wells was 2.0 g/mL), and the PBS group was used as a control. After continuing the incubation for 4 h, cells were collected by centrifugation (800 rpm, 5 min) and washed twice with PBS, and finally dispersed with 500 μL PBS and placed in a flow-through tube for assay. The test results showed that the endocytosis of Dar-Ps-Cy5 in LP-1 cells was significantly higher than that of Ps-Cy5, where the cells incubated with $Dar_{4.4}$-Ps-Cy5 had the highest fluorescence intensity, which was 6.4-fold higher than that of the Ps-Cy5 control (Supplementary FIG. 7A), indicating that the introduction of Dar significantly enhanced the cellular uptake of Ps-Cy5, and that when bonded to the surface of each vesicle 4.4 Dar was best targeted when the surface of each vesicle was bonded.

The endocytosis behavior of $Dar_{4.4}$-Ps-Cy5 and Ps-Cy5 in LP-1 cells was then further investigated using CLSM. The specific experimental steps were as follows: polylysine (300 μL, 0.1 mg/mL) pretreated pellets were placed in a 24-well plate with LP-1 cell suspension ($3 \times 10^5$ cells/well) and incubated in an incubator for 24 h. After 24 h, 200 μL of $Dar_{4.4}$-Ps-Cy5 and Ps-Cy5 were added respectively (the concentration of Cy5 in the wells was 40 g/mL). After continuing incubation for 4 h, the medium was carefully removed and washed 3 times with PBS, followed by fixation with 4% paraformaldehyde solution for 15 min, washed 3 times with PBS, then the nuclei of the cells were stained with DAPI for 3 min, and washed 3 times with PBS, and finally the slices were blocked with glycerol and observed and photographed with CLSM (Leica, TCS SP5). Attachment 7B shows the graph of the uptake results of $Dar_{4.4}$-Ps-Cy5 and Ps-Cy5 in LP-1 cells. The results showed that when LP-1 cells were incubated with $Dar_{4.4}$-Ps-Cy5 for 4 hours, obvious red fluorescence was presented around the nucleus, while the fluorescence was weaker in the cells incubated with Ps-Cy5, indicating that Dar-Ps-Cy5 possesses excellent targeting and efficient and rapid cellular endocytosis.

Figure 8:
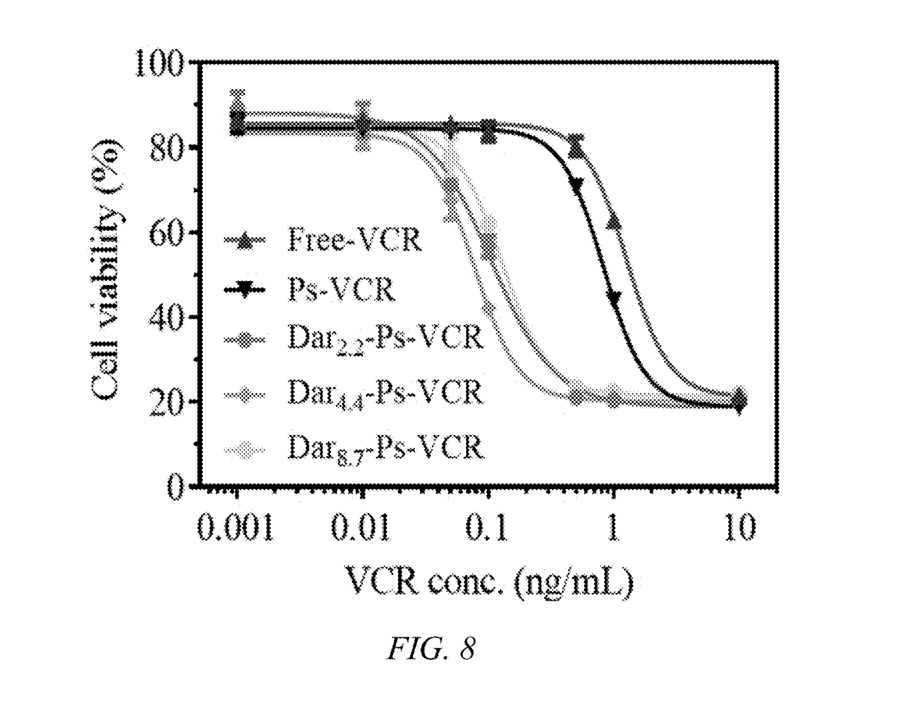
FIG. 8 shows the toxicity of Dar-Ps-VCR, Ps-VCR and free VCR in LP-1 cells at different targeting densities in Example 8.

Example 8 Cytotoxicity Test of Dar-Ps-VCR-Targeted Polymeric Vesicle Nanomedicine The in vitro anti-tumor activity of Dar-Ps-VCR against LP-1 multiple myeloma cells was determined using a CCK-8 kit, with MV4-11 cells as a control. LP-1 cells were first spread in 96-well plates (15,000/well) and placed in an incubator at 37° C. with 5% $CO_2$ for 24 h. After that, 20 µL of Dar-Ps-VCR, Ps-VCR and free VCR containing different Dar surface densities were added to each well, and the final concentrations of VCR in the wells were 0.001, 0.01, 0.05, 0.1, 0.5, 1 and 10 ng/mL. After incubation at 37° C. for 48 h, 10 µL of CCK-8 solution was added to each well to continue the incubation for 4 h. Finally, its absorbance value at 492 nm was tested by an enzyme marker. Cell viability was calculated by the ratio of the absorbance value of the experimental group to the absorbance value of the cells incubated with the addition of PBS, and the experiment was performed in parallel for four groups (mean±SD, z=4). The cytotoxicity results of Dar-Ps-VCR vesicle nanomedicine with different targeting densities (z=5) on LP-1 cells are plotted in the accompanying FIG. 8. The results showed that the cytotoxicity was strongest when 4.4 Dar were bonded on the surface of each vesicle ($Dar_{4.4}$-Ps-VCR), with the LC50 ($IC_{50}$) as low as 0.07 ng/mL, which was 20- and 12-fold lower compared to the free VCR ($IC_{50}$: 1.38 ng/mL) and the nontargeted control Ps-VCR (z of 5, $IC_{50}$: 0.85 ng/mL), suggesting that the introduction of Dar significantly increased the targeted delivery and rapid intracellular release of VCR.

Figure 9:
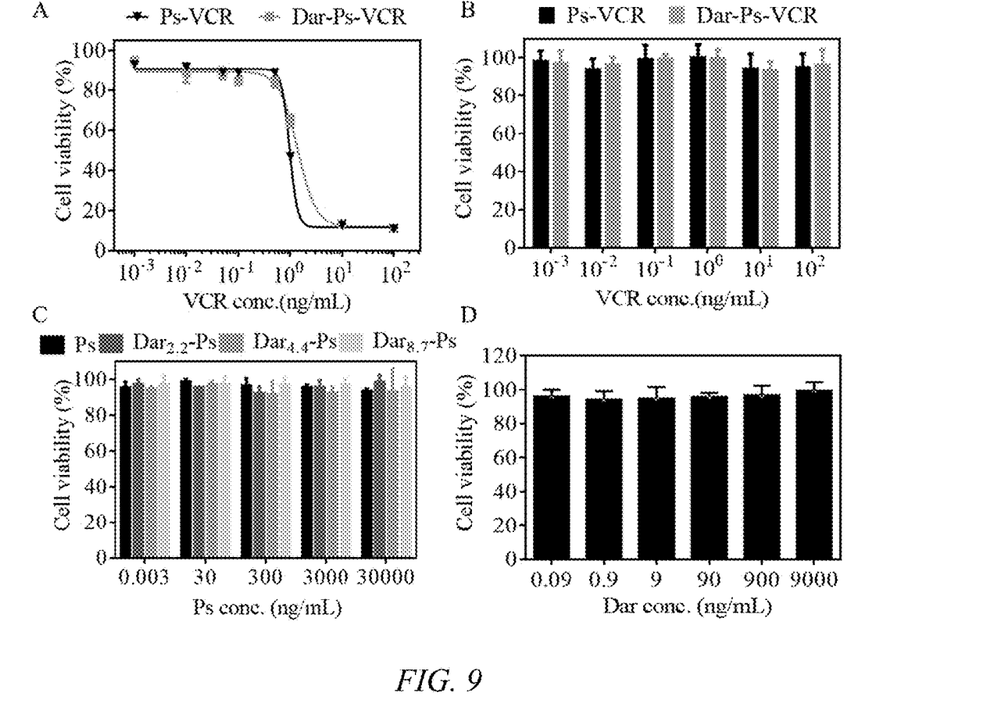
FIG. 9 shows the toxicity of Dar-Ps-VCR and Ps-VCR in (A) MV4-11 cells and (B) L929 cells and (C) Dar-Ps and (D) Dar in LP-1 cells in Example 8.

MV4-11 cells (12,000/well) and L929 fibroblasts (3,000/well) were spread in 96-well plates and incubated for 24 hours, then 20 µL of $Dar_{4.4}$-Ps-VCR (z of 5) and Ps-VCR (z of 5) were added to each well, with the final concentration of VCR in the wells ranging from 0.0001-100 ng/mL. MV4-11 cells were incubated at 37° C. for 48 h. After incubation at 37° C., 10 µL of CCK-8 solution was added to each well to continue incubation for 4 h. The cells were tested for absorbance values at 492 nm using an enzyme marker. L929 cells were incubated at 37° C. for 48 h. After incubation at 37° C., 10 µL of PBS solution (5 mg/mL) with MTT was added to each well and incubated for 4 h. Afterwards, the medium was carefully removed and 150 µL of DMSO to dissolve the resulting metazan crystals, and their absorbance at 570 nm was tested with an enzyme marker; the results showed that the $IC_{50}$ was 20-fold higher in MV4-11 cells than in LP-1 cells (Supplementary FIG. 9A). More interestingly, for L929 normal cells, $Dar_{4.4}$-Ps-VCR and Ps-VCR did not show significant toxicity even at VCR concentrations as high as 100 ng/mL, and the cell survival rates were both close to 100% (Supplementary FIG. 9B). These results collectively indicated that Dar-Ps-VCR could selectively target and efficiently kill multiple myeloma cells with less toxicity to normal cells.

In addition, the same method was used to test the toxicity of Dar-Ps and Ps empty vesicles as well as free Dar on LP-1 cells, and the results showed that cell survival was close to 100% without significant cytotoxicity even at Ps concentrations up to 30 g/mL (Attachment 9C), and Dar concentrations of 9 µg/mL (Attachment 9D).

Dar-Ps-VCR in the following Examples all refer to $Dar_{4.4}$-Ps-VCR vesicular nanomedicine (z of 5) and Dar-Ps-Cy5 all refer to $Dar_{4.4}$-Ps-Cy5 (z of 5).

Example 9 Dar-Ps-VCR-Targeted Polymeric Vesicle Nanomedicine Induced Apoptosis

Figure 10:
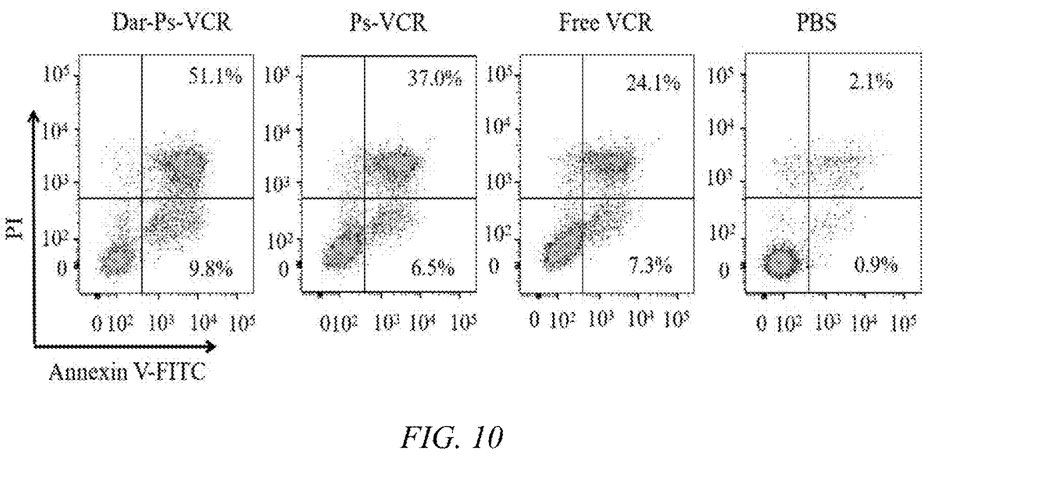
FIG. 10 shows flow cytometry determination of apoptosis induced by Dar-Ps-VCR, Ps-VCR and free VCR in LP-1 cells in Example 9.

Apoptosis assay of Dar-Ps-VCR was treated by double staining with fluorescent dye AnnexinV-FITC/PI and then tested by flow cytometry. LP-1 cells were first spread in 6-well plates at a density of $2 \times 10^5$ cells/well and incubated in the incubator for 24 h. After 24 h, 200 µL of Dar-Ps-VCR, Ps-VCR, and free VCR were added (the in-well concentration of VCR was 0.5 ng/mL), and the cells with only PBS were used as a control. After incubation in the incubator for 48 h, LP-1 cells were collected by centrifugation (800 rpm, 5 min) and washed twice with ice PBS, and finally 200 µL of Binding buffer was added to each sample to resuspend the cells (the cell density was approximately $10^6$ cells/mL). After blowing uniformly, 100 µL was taken into the flow tube and 5 µL of AnnexinV-FITC and 10 µL of PI solution were added sequentially, and the cells were stained at room temperature and protected from light for 15 min, then 400 µL of PBS was added and mixed uniformly, and measured by flow cytometry within 1 h. The cells were then stained with PBS for 15 min at room temperature and protected from light for 15 min. Among them, the samples in the PBS group that were treated in a 50° C. water bath for 5 min and fixed with 4% paraformaldehyde for 5 min were used as the early apoptosis group and the late apoptosis group, respectively, and stained for 15 min by adding 5 µL of AnnexinV-FITC solution and 10 µL of PI solution, respectively. The results of apoptosis induced by Dar-Ps-VCR in LP-1 cells are shown in Appendix FIG. 10. The results showed that Dar-Ps-VCR could effectively induce apoptosis, and when the concentration of VCR was 0.5 ng/mL, it could cause 60.8% apoptosis, and the rate of apoptosis was significantly higher than that of the non-targeting control Ps-VCR group (43.4%) and the free VCR group (31.4%), and the number of late apoptotic cells in all the groups was significantly more than that of early apoptosis.

Example 10 Construction of Dutch LP-1-Luc In Situ Multiple Myeloma Mouse Model

Figure 11:
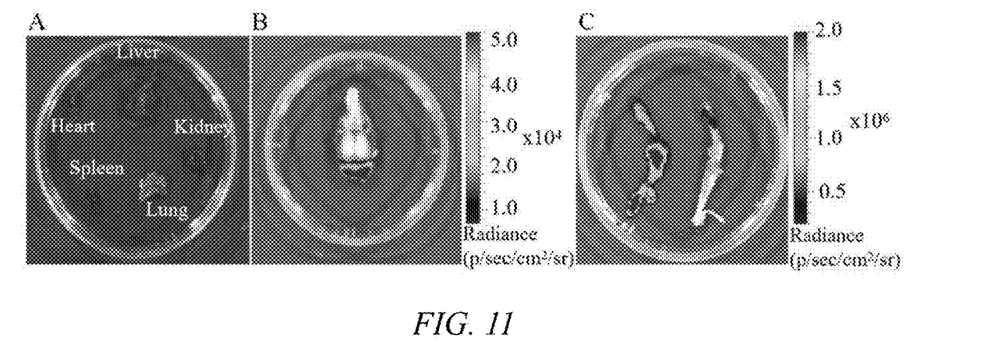
FIG. 11 is ex-vivo bioluminescence imaging in Example 10 to observe the tumor distribution of LP-1-Luc tumors in various organs, skull, and hind leg bones of mice.

All animal experiments and manipulations were approved by the Laboratory Animal Center of Soochow University and the Animal Care and Use Committee of Soochow University. Establishment of in situ MM tumor model: 6-week-old ZOD/SCID female mice were used, firstly, the mice were cleared of marrow by intraperitoneal injection of 10 mg/mL of cyclophosphamide solution on two consecutive days, 2 mg per mouse per injection, and then on the third day, LP-1-Luc cells ($8 \times 10^6$ cells/each) were injected into the mice through the tail vein, and the in vivo imaging and treatment were started on the 10th day after inoculation. Mice were simultaneously weighed. To study tumor distribution in the LP-1-Luc in situ multiple myeloma mouse transplantation model, mice were injected intraperitoneally with fluorescein potassium salt through the mice on day 35 post-inoculation, and 8 minutes later, mice were dissected and collected for fluorescence imaging of the heart, liver, spleen, lungs, kidneys, intestines, skull, and hind leg bones. The attached FIG. 11 shows the results of ex vivo bioluminescence imaging of various organs, skull as well as hind leg bones of Hol LP-1-Luc in orthotopic multiple myeloma mice. From the images, it can be seen that 35 days after inoculation, LP-1-Luc tumors were mainly concentrated in the hind legs and skulls of the mice, and there was no obvious distribution of tumor Luc signals in the heart, liver, spleen, lungs, kidneys, and other organs.

Figure 12:
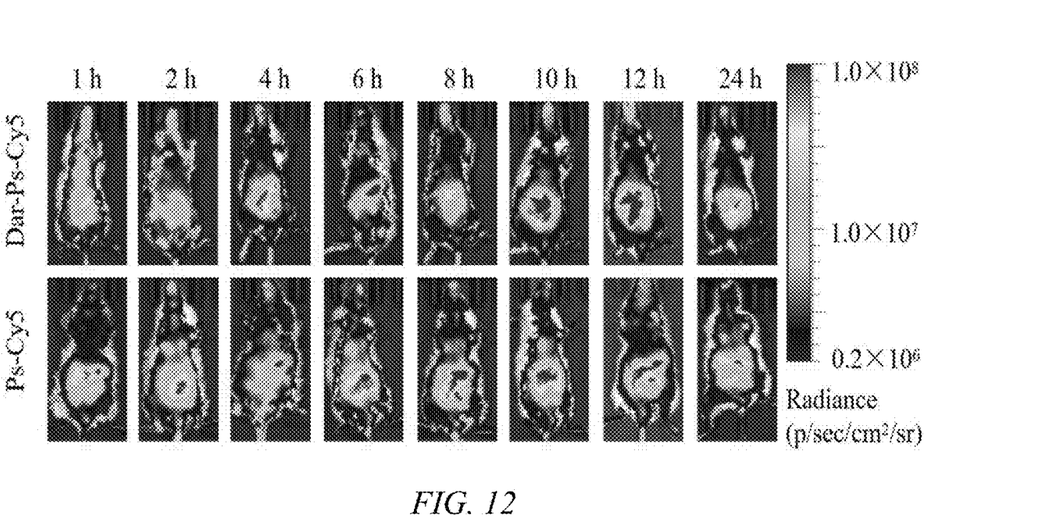
FIG. 12 shows in vivo fluorescence imaging of loaded in situ LP-1-Luc multiple myeloma mice in Example 11 after tail vein injection of Dar-Ps-Cy5 and Ps-Cy5 at different time points.

Example 11 Dar-Ps-Cy5 In Vivo Imaging Experiments in Hol LP-1-Luc in Orthotopic Multiple Myeloma Mice The distribution of Dar-Ps-Cy5 in LP-1-Luc in orthotopic multiple myeloma mice was obtained by mouse live imaging analysis. On day 37 post-inoculation (when the mice were about to develop the disease), 200 μL of Dar-Ps-Cy5 and Ps-Cy5 solution (250 μg Cy5 equiv./kg) were injected into the mice through the tail vein, respectively, and mice were anesthetized with isoflurane for in vivo fluorescence imaging at 1, 2, 4, 6, 8, 10, 12, and 24 hours after the injections, using the Lumia II software to image the biological distribution in mice with myeloma mice (Supplementary FIG. 12). The results showed that Dar-Ps-Cy5 was efficiently targeted and enriched to the tumor site, and its fluorescence signal in the legs and head of mice was significantly higher than that of the non-targeted Ps-Cy5 group.

Example 12 Anti-Tumor Effects of Dar-Ps-VCR in Hol LP-1-Luc in Orthotopic Multiple Myeloma Mice

Figure 13:
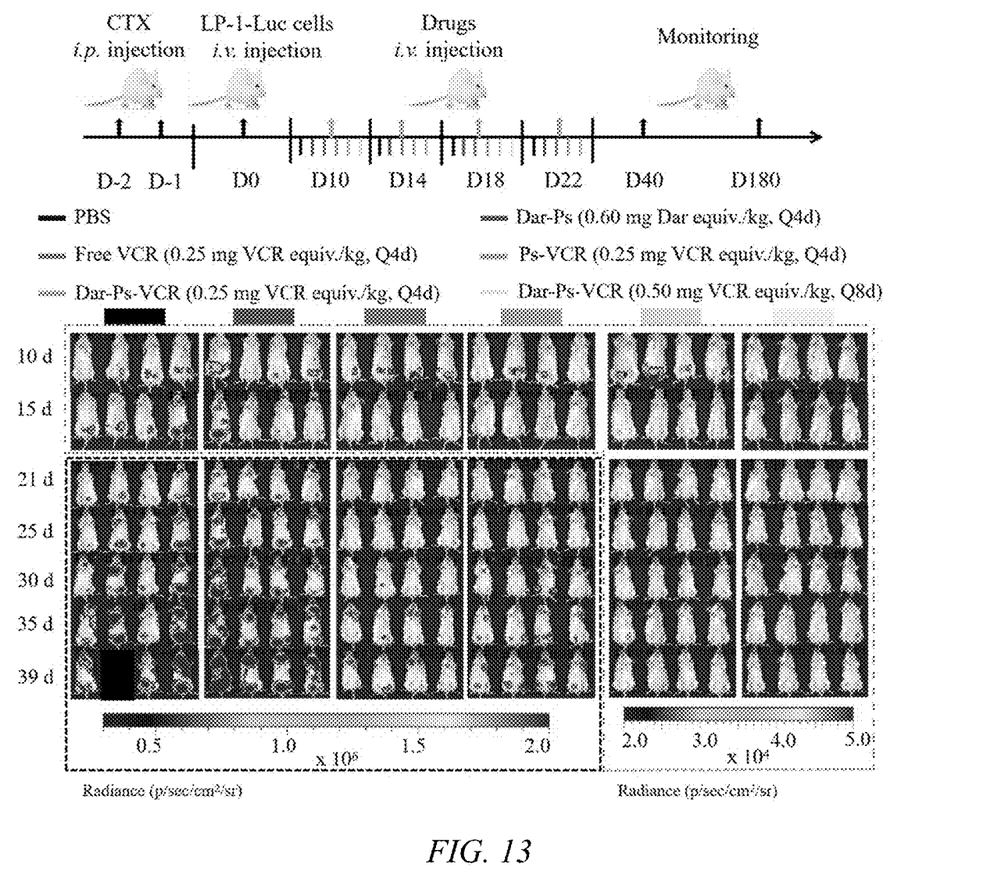
FIG. 13 shows a workflow for the construction and treatment of an in situ LP-1-Luc multiple myeloma mouse transplantation model and a graph of the therapeutic effect of in vivo imaging evaluating Dar-Ps-VCR on an in situ LP-1-Luc multiple myeloma mouse model in Example 12.
Figure 14:
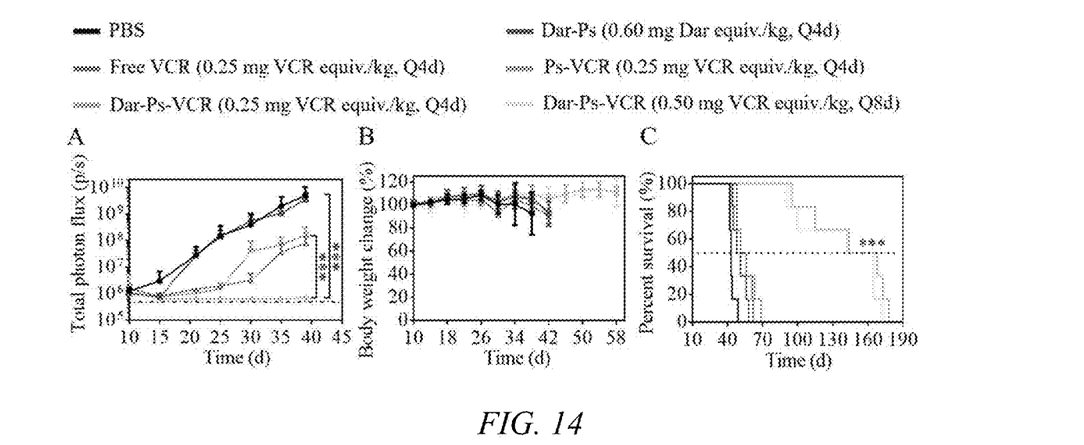
FIG. 14 shows graphs of Luc fluorescence signaling changes; body weight changes; and Kaplan-Meier survival curves for mice in different treatment groups in Example 12.

To investigate the anti-tumor effect of Dar-Ps-VCR in Holo-Positive LP-1-Luc multiple myeloma mice, treatment experiments were initiated when the bioluminescence intensity reached $1.2 \times 10^6$ p/sec/cm$^2$/sr on day 10 post-inoculation. There were two dosing regimens that maintained the same total VCR administration: one with a VCR dose of 0.25 mg/kg, one injection given on 4 days for a total of 4 injections, denoted as Dar-Ps-VCR (0.25 mg VCR equiv./kg, Q4d); and the other with a VCR dose of 0.50 mg/kg, one injection given on 8 days for a total of 2 injections, denoted as Dar-Ps-VCR (0.50 mg VCR equiv./kg, Q8d). Based on the first dosing regimen, equal VCR doses of Ps-VCR and free VCR, equal equivalents of Dar-Ps, and PBS were used as controls. Each treatment group consisted of 10 hormonal mice, of which 4 were used for bioluminescence imaging and 6 were used to monitor body weight and observe survival. It was found that the mice in the PBS group continued to have rapid growth of LP-1-Luc cells, which started to develop when the bioluminescence intensity reached $1.0 \times 10^9$ p/sec/cm$^2$/sr on days 37-45 post inoculation, and manifested as paralysis of both legs, weight loss and death occurred (Supplementary FIG. 13). During the administration treatment period (10-22 days), there was no significant increase or even a slight decrease in Luc signal in mice in the Dar-Ps-VCR two administration groups, Ps-VCR and free VCR groups, indicating that they could effectively inhibit the spreading and proliferation of LP-1-Luc cells in mice. At the end of drug administration, the tumors of mice in the non-targeted Ps-VCR and free VCR groups began to recur, and Luc bioluminescence signals increased rapidly, i.e., 157- and 53-fold by day 39, respectively. However, both groups of mice injected with Dar-Ps-VCR in the tail vein continued to inhibit the growth of LP-1-Luc tumors, and no significant Luc signal was detected even at day 39 post-inoculation, and their fluorescence values were comparable to the background signals of healthy mice, which were 235- and 114-fold lower compared to the Ps-VCR and free VCR groups, and about 5000-fold lower compared to the untreated PBS group. around 5000-fold. The tumor growth trend of mice in the empty vector Dar-Ps group was similar to that of the PBS group (Supplementary FIG. 14A). These results indicated that Dar-Ps-VCR could efficiently target deliver VCR to the tumor site and completely eliminate the tumor in the short term. Notably, mice in all treatment groups showed no significant changes in body weight during administration until mice would show weight loss at the onset of disease, indicating that they had relatively low toxicity (Supplementary FIG. 14B). In addition, the survival of mice in the Dar-Ps-VCR treatment group was significantly prolonged (Supplementary FIG. 14C), in which the median survival of mice in the 0.25 mg VCR equiv./kg, Q4d and 0.50 mg VCR equiv./kg, Q8d administration modes was 156 and 154 days, respectively, compared with that in the PBS group (43 days), Dar-Ps group (49.5 days), Ps-VCR (51 days) and free VCR group (52 days) were prolonged by 3.0-3.6-fold. Together, these results suggest that the introduction of Dar significantly increased the selective targeting of Ps-VCR, which efficiently inhibited the growth of in situ multiple myeloma.

Figure 15:
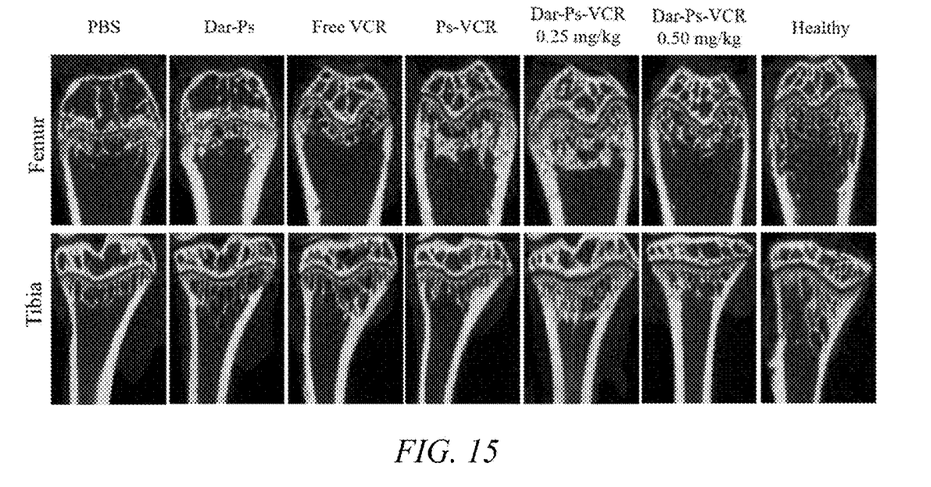
FIG. 15 shows micro-CT maps of the femur (Femur) and tibia (Tibia) of mice in different treatment groups in Example 12.
Figure 16:
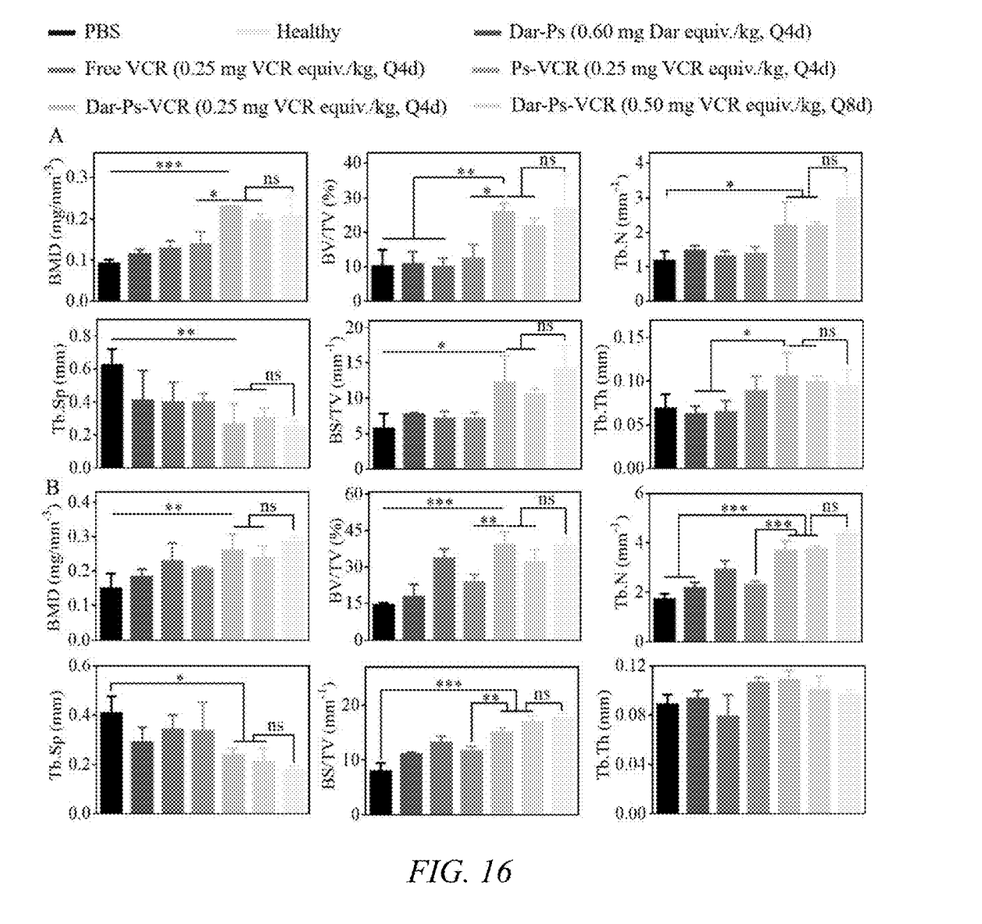
FIG. 16 shows the analysis of various metrics of (A) femur and (B) tibia of mice in different treatment groups in Example 12. (BMD: bone mineral density; BV/TV: bone volume fraction; Tb.N: number of trabeculae; Tb.Sp: trabecular separation; BS/TV: bone surface area; Tb.Th: trabecular thickness.

Osteolytic lesions are one of the common clinical manifestations of MM patients, so the relevant indexes of femur and tibia in mice of each treatment group were evaluated using micro-CT. The results revealed that the hind leg bones of the mice in the PBS and Dar-Ps groups had severe osteolysis and a large number of bone trabeculae were missing, while the osteolytic lesions of the mice were significantly improved after treatment with Dar-Ps-VCR, which was similar to that of the healthy mice (Supplementary FIG. 15). Subsequently, by further quantitative analysis, it was found that the bone mineral density, bone volume fraction, number of trabeculae, trabecular separation, and bone surface area of the femur and tibia in the mice in the Dar-Ps-VCR-targeted treatment groups under both administration modalities were similar, and there were significant differences between them and the untreated PBS group, whereas there were no significant differences between the indices and those of the healthy mice (Supplementary FIG. 16). In addition, some indexes such as bone volume fraction were also significantly different from those of the non-targeted Ps-VCR control group, further indicating that the introduction of Dar significantly increased the efficacy of Ps-VCR in multiple myeloma in situ and effectively inhibited osteolytic lesions.

The invention claimed is:

1. A drug-loaded polymer vesicle, wherein the drug-loaded polymer vesicle is prepared from a small molecule drug and an amphiphilic block polymer; or from the small molecule drug, the amphiphilic block polymer, a functionalized polyethylene glycol (PEG) polymer, and a targeting molecule;

wherein the chemical structural of the amphiphilic block polymer is one of the following formulas:

-continued wherein, in the amphiphilic block polymer, a molecular weight of a PEG of the amphiphilic block polymer is 3000-8000 Da; a molecular weight of a hydrophobic chain segment of the amphiphilic block polymer is 2.5-6 times that of the PEG; a molecular weight of a z chain segment of the amphiphilic block polymer is 8%-30% of that of the hydrophobic chain segment; x and y are determined by the molecular weights of the PEG and the hydrophobic chain segment; z is 5-15; and wherein the small molecule drug is vincristine sulfate, adriamycin hydrochloride, epothilone hydrochloride, verapamil hydrochloride, irinotecan hydrochloride, or resiquimod; and the targeting molecule is a targeting monoclonal antibody.

2. The drug-loaded polymer vesicle according to claim 1, wherein the targeting monoclonal antibody is a CD38-targeting monoclonal antibody.

\* \* \* \* \*